United States Patent [19]

Todaro et al.

[11] Patent Number: 4,706,158
[45] Date of Patent: Nov. 10, 1987

[54] CIRCUIT BREAKER WITH SELF-CONTAINED ELECTRONIC TRIP ACTUATOR AND UNDERVOLTAGE RELEASE CONTROL CIRCUIT

[75] Inventors: Frank A. Todaro, Clinton; John J. Dougherty, Avon, both of Conn.

[73] Assignee: General Electric Company, New York, N.Y.

[21] Appl. No.: 911,179

[22] Filed: Sep. 24, 1986

[51] Int. Cl.$^4$ .................... H02H 3/24; H01H 47/28
[52] U.S. Cl. ...................................... 361/92; 361/187
[58] Field of Search ............... 361/86, 92, 142, 187; 335/20; 200/293

[56] References Cited

U.S. PATENT DOCUMENTS 4,301,434 11/1981 Castonguay ..................... 335/20

FOREIGN PATENT DOCUMENTS 2033177 5/1980 United Kingdom ............... 361/92

Primary Examiner—L. T. Hix
Assistant Examiner—David Porterfield
Attorney, Agent, or Firm—Richard A. Menelly; Walter C. Bernkopf; Fred Jacob

[57] ABSTRACT

A molded case circuit breaker provides both overcurrent protection as well as accessory protection function by means of a self-contained electronic trip actuator module. Undervoltage release function is provided by a separate undervoltage release assembly that includes the undervoltage coil and an electronic control circuit. Shunt trip facility is provided by the shunt trip coil and a shunt trip control circuitry. The overcurrent, shunt trip and undervoltage release coils are arranged on a magnetic circuit within the electronic actuator module.

10 Claims, 6 Drawing Figures

CIRCUIT BREAKER WITH SELF-CONTAINED ELECTRONIC TRIP ACTUATOR AND UNDERVOLTAGE RELEASE CONTROL CIRCUIT

BACKGROUND OF THE INVENTION

A molded case circuit breaker containing a common trip unit and accessory module for field installation of optional accessory function is described within U.S. patent application Ser. No. 882,989, filed July 7, 1986, and entitled "Combined Trip Unit And Accessory Module For Electronic Trip Circuit Breaker". The circuit breaker uniquely contains the current sensing transformers and signal processing electronics within a common enclosure with the circuit breaker operating mechanism. The combined trip unit and accessory module provide overcurrent, shunt trip and undervoltage release facility to the breaker by means of a common trip actuator assembly. The Application is incorporated herein for reference purposes and should be reviewed for its teaching of the mechanical interaction of the trip unit and accessory module with the circuit breaker interruption mechanism.

U.S. patent application Ser. No. 817,213, filed Jan. 8, 1986, and entitled "Interchangeable Mechanism For Molded Case Circuit Breaker", describes a compact circuit breaker operating mechanism, which is automatically assembled, in part, and which is interchangable within breakers of different ampere ratings. This Application is incorporated for reference purposes and should be reviewed for its description of an operating mechanism similar to that used within the circuit breaker of the instant invention.

Molded case circuit breakers provide overcurrent protection by responding to current levels within a protected circuit in excess of predetermined current thresholds. In both residential as well as in lower rating industrial breakers, a thermal-magnetic trip unit responds to such threshold currents by contacting and articulating the operating mechanism to separate the breaker contacts. Electronic trip units are feasibly employed within those industrial circuit breakers of higher ampere ratings and require an intermediate actuator to articulate the operating mechanism, usually in the form of a magnetically-latched solenoid. A current pulse to the solenoid generates an opposing magnetic flux allowing the actuator to release under the bias provided by a charged spring. When a common overcurrent and accessory trip unit, such as described within the former referenced patent application is employed within such an industrial rated breaker, additional circuit logic must be provided for each accessory function. The overcurrent protection logic is provided by the electronic trip unit signal processor, which responds solely to overcurrent conditions. Separate logic circuits are required for undervoltage release units and shunt trip units.

One purpose of the instant invention is to provide an electronic control circuit for an undervoltage release unit coupled with a common actuator that separately provides overcurrent trip facility. The electronic circuit components for the undervoltage release unit are carried by a separate printed wiring board that is integral with the undervoltage release coil.

DESCRIPTION OF THE PREFERRED EMBODIMENT

Figure 1:
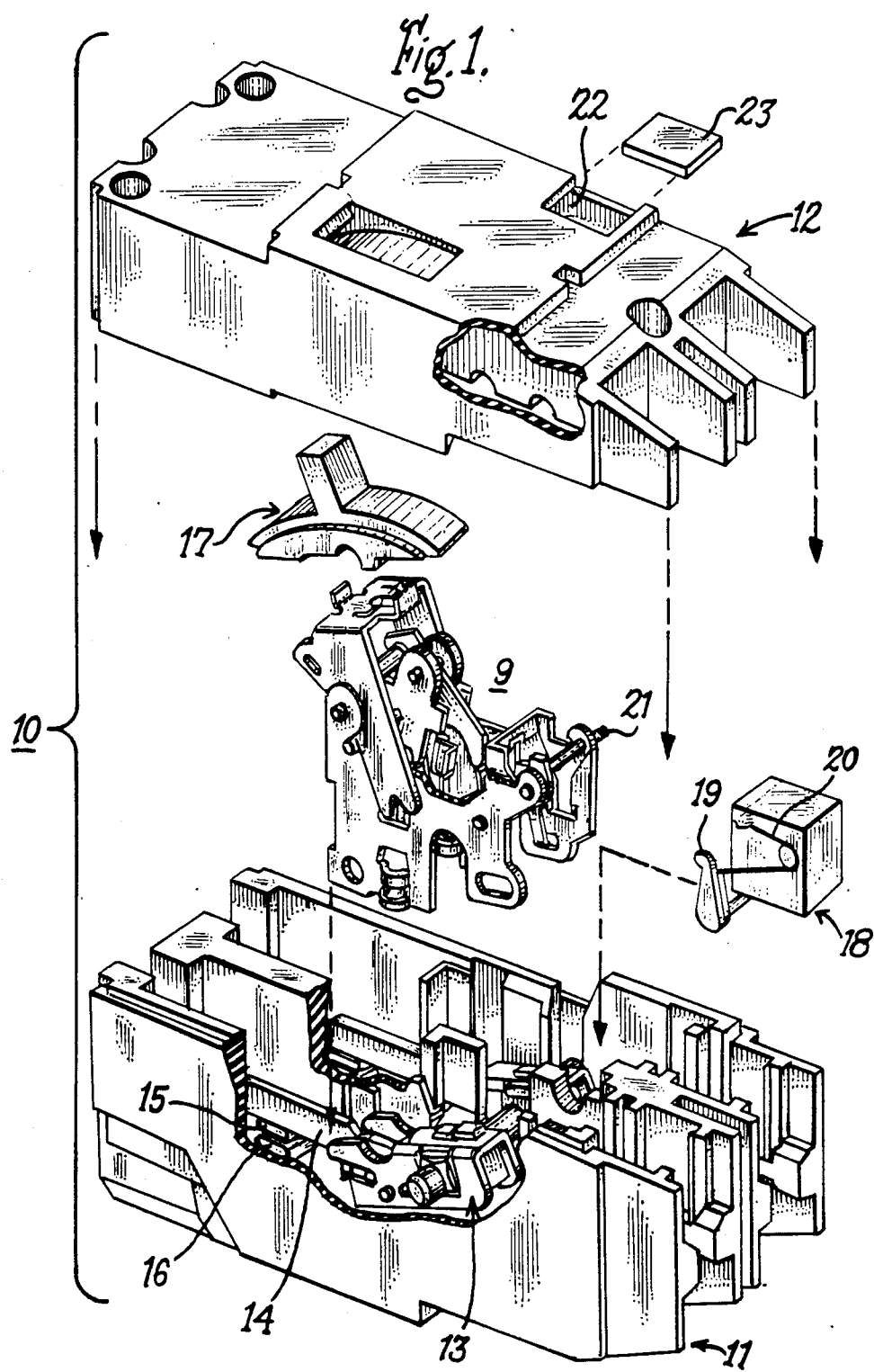
FIG. 1 is a top perspective view, in isometric projection, of a circuit breaker having an electronic trip actuator module according to the invention.

A lower ampere rated molded case industrial circuit breaker of the type used, for example, in lighting panelboards is shown at 10 in FIG. 1. The breaker includes a plastic case 11 and a plastic cover 12 attached thereto by rivets or screws. A crossbar assembly 13 is arranged within the case with a movable contact arm 14 extending therefrom and carrying a movable contact 15 at one end, which connects with a fixed contact 16 to complete the electrical circuit through the breaker. An operating mechanism 9 is arranged over the crossbar and interfaced with the movable contact arm for automatic separation of the contacts when the mechanical actuator 19 arranged on the electronic actuator module 18 (hereafter "actuator module") strikes a trip bar extension 21 to articulate the operating mechanism. As described in the aforementioned patent application Ser. No. 882,989, the mechanical actuator 19 is magnetically latched against the bias of a compression spring 20 mounted on the side wall of the actuator. An operating handle 17 extends through the cover for manual opening and closing of the contacts and for resetting the operating mechanism after a tripping operation. An accessory door 23 mounted on the cover allows access to the actuator by means of an opening 22 through the cover.

Figure 2:
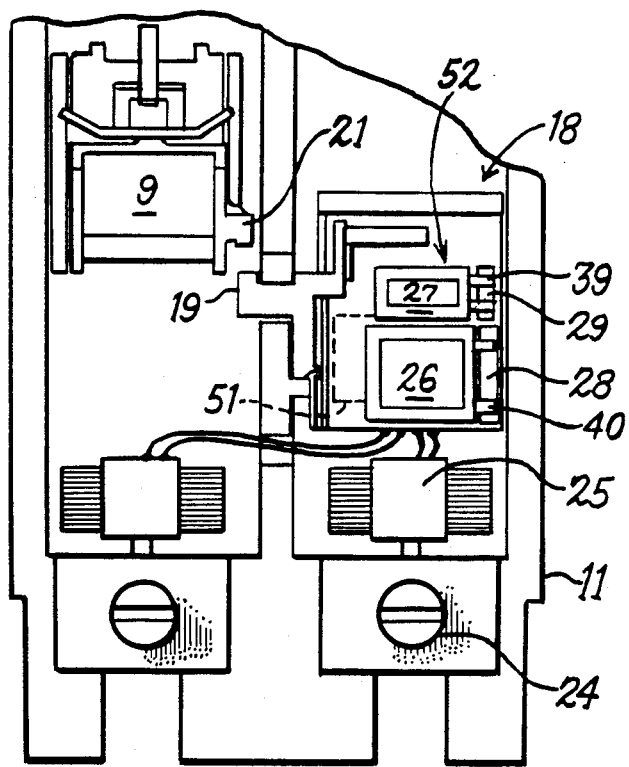
FIG. 2 is a top view of a part of the circuit breaker depicted in FIG. 1.

The actuator module 18 is shown in FIG. 2 with its cover removed for access to the undervoltage release coil 26 and shunt trip coil 27 contained within the actuator. An undervoltage control circuit is arranged on the undervoltage printed wire board 28 integrally formed with the undervoltage coil support structure and a pair of electrical connectors 40 extend from the undervoltage printed wiring board for providing electrical input signals to the undervoltage coil. A shunt trip control circuit is arranged on the shunt trip printed wire board 29 and a pair of shunt trip electrical connectors 39 extend from the shunt trip printed wire board for providing input signals to the shunt trip coil. A pair of current transformers 25 provide electrical input from the load terminals 24 to the trip unit signal processor located on the trip unit printed wire board 51 under the actuator module 18. The magnetic latch 52 utilizes an armature 30 (FIG. 3) to control the operation of the mechanical actuator 19 with respect to the trip bar extension 21 and the circuit breaker operating mechanism 9, as fully described in referenced patent application Ser. No. 882,989.

Figure 3:
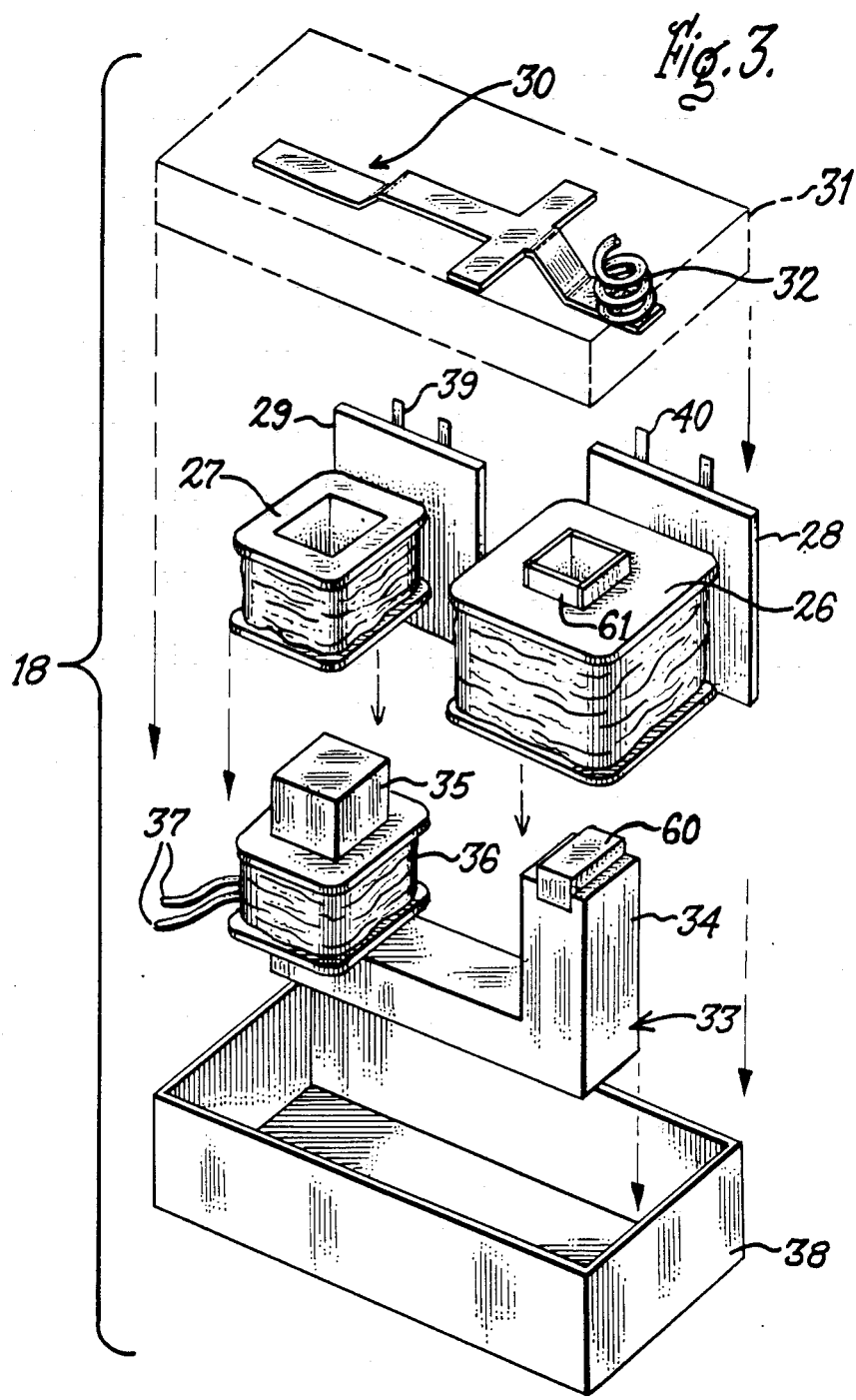
FIG. 3 is a top perspective view, in isometric projection, of the electronic trip actuator module of FIG. 1.

The operative arrangement between the armature 30 positioned on the interior of the accessory cover 31 and biased against the cover by means of a compression spring 32 is best seen by referring now to FIG. 3. The integral arrangement of the undervoltage release coil 26 with the undervoltage printed wire board 28 allows the undervoltage release coil to be downloaded onto one leg 34 of the U-shaped stator 33 in a single operation. The magnet 60 mounted on top of leg 34 provides the necessary magnetic flux to the magnetic stator 33 to hold the armature 30 against the tripping bias of the compression spring. The same integral arrangement of the shunt trip coil 27 on the shunt trip printed wire board 29 allows the shunt trip coil to be downloaded onto the other leg 35 of the stator on top of the trip coil 36, which is prepositioned thereon. The leads 37 of the trip coil directly connect the trip coil with the trip unit printed wire board 51, shown earlier in FIG. 2. The U-shaped stator 33 is then positioned within the case 38 and the cover 31 is attached to automatically align the armature 30 with both legs 34, 35 of the stator to complete the assembly of the actuator module 18. The undervoltage release coil 26 includes a magnetic shunt 61 which decreases the magnetic flux through the stator 33 generated by the permanent magnet 60 arranged on the top of the stator leg 34, such that the magnetic force on the armature 30 is insufficient to hold the armature against the bias of the compression spring 32, when the undervoltage release coil is not energized.

Figure 4:
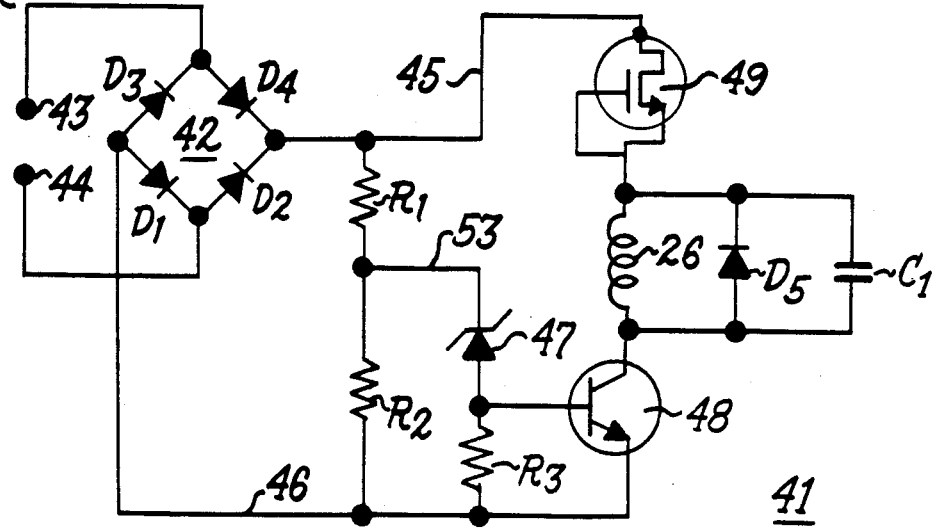
FIG. 4 is a diagrammatic representation of the control circuit for the undervoltage release coil shown in FIG. 3.
Figure 5:
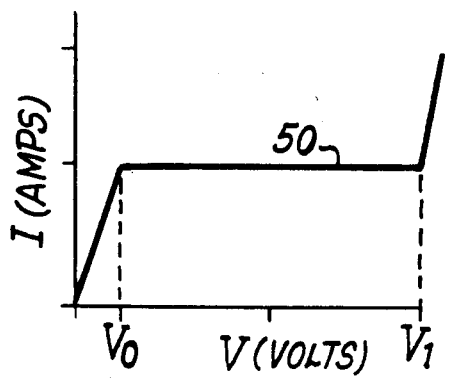
FIG. 5 is a graphic representation of the undervoltage release current profile through the FET within the circuit of FIG. 4.

The control circuit 41 for operating the undervoltage release coil 26 is shown in FIG. 4 and comprises a pair of terminals 43, 44, which connect with an external circuit that supplies an undervoltage release signal to a positive and negative bus 45, 46 through a bridge rectifier 42 consisting of diodes $D_1$–$D_4$. The positive bus connects through one leg of a voltage divider consisting of resistors $R_1$, $R_2$. The signal from the positive bus generates a test voltage across resistor $R_1$, which is applied to the base of a bipolar transistor switch 48 through Zener diode 47 and conductor 53. The Zener diode turns on at a predetermined clamping voltage of approximately 70% of the undervoltage release signal appearing across the terminals 43, 44. Resistor $R_2$ forms the other leg of the voltage divider and resistor $R_3$ connects the Zener diode with the emitter of the transistor switch 48. When the transistor is turned on, current passes between buses 45, 46 through a field effect transistor (FET) 49 and through the undervoltage release coil 26 in series with both the FET 49 and the transistor switch 48. A diode $D_5$ and capacitor $C_1$ maintain a relatively constant voltage drop across the undervoltage release coil by forming an RC circuit with the wire resistance of the undervoltage release coil winding. The function of the FET 49 is to maintain a constant current through the undervoltage release coil over a wide range of fluctuations in the undervoltage release signal voltage in order to minimize heating effects that would otherwise occur with increased system voltages as well as to maintain a constant magnetomotive force within the magnetic circuit. The operation of the FET can be seen by referring to the current profile 50 shown in FIG. 5, which represents the current through the undervoltage release coil in series with the FET. The constant current through the FET is caused by the so-called "channel effect" within the FET which maintains the current through the FET at a constant predetermined value between an operating window defined between an initial voltage $V_0$ across the FET and a second voltage $V_1$, as indicated.

Figure 6:
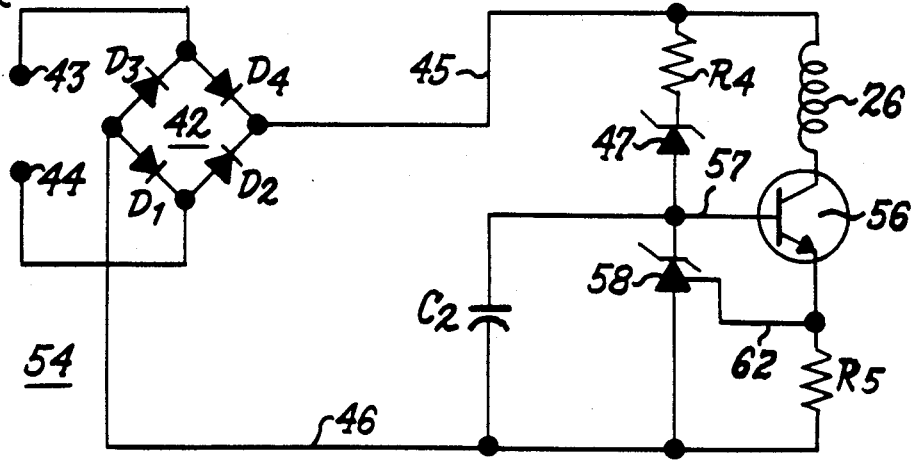
FIG. 6 is a diagrammatic representation of an alternate control circuit for the undervoltage release coil of FIG. 3.

A simplified UV control circuit 54 is shown in FIG. 6 where the terminals 43, 44 connect with the positive and negative bus 45, 46 through the bridge rectifier 42. The Zener diode 47 connects with the positive bus through a limiting resistor $R_4$ and with the negative bus through a programmable regulator shunt diode 58 (hereafter regulator diode), as indicated. The regulator diode is a TL431 obtained from Motorola, Inc. The cathode is connected by conductor 57 to the anode of the Zener diode 47 and the base of a bipolar transistor 56 which functions as a current regulator as well as a switch. The emitter of the transistor is connected by conductor 62 to the reference input of the regulator diode and to a feedback resistor $R_5$. The collector of the transistor connects with the undervoltage release coil 26 to excite the coil when the voltage level across Zener diode 47 is above its clamping voltage. The function of the regulator diode, in conjunction with resistor $R_5$ and transistor 56, is to maintain a constant current through the undervoltage release coil 26 when the voltage applied to terminals 43, 44 is greater than the clamping voltage of the Zener diode. This maintains a constant current through the undervoltage release coil to both limit the amount of energy expended within the coil as well as to keep the magnetomotive force at a constant value. The filter capacitor $C_2$ ensures that the voltage across the regulator diode remains constant.

A circuit breaker having optional accessory features including electronic control circuits integral with the undervoltage release coil and shunt trip coil contained therein has herein been described. The circuits comprise a minimum of electronic components that are both economic to manufacture as well as economical to operate over long periods of continuous use.

Having thus described my invention, what I claim as new and desire to secure by Letters Patent is:

1. A circuit breaker with self contained electronic trip actuator comprising:

a molded plastic circuit breaker cover and a molded plastic circuit breaker case;

a pair of separable contacts within said case electrically connected in series within a protected electric circuit and controlled by an operating mechanism to separate said contacts upon the occurrence of an overcurrent condition through said protected electric circuit;

an electronic actuator within said circuit breaker case and operatively arranged with said operating mechanism for articulating said operating mechanism to separate said contacts, said electronic actuator including a magnetic latch arranged for holding a mechanical actuator against the bias of a charged spring, said magnetic latch including an undervoltage coil providing magnetic flux to hold said mechanical actuator in a non-actuating position; and an electronic undervoltage release control circuit within said circuit breaker case connected with said undervoltage release coil and including a rectifier having an output connected across a positive and a negative bus and an input connected with an undervoltage release signal, a voltage divider across said positive and negative bus having one leg connected to the base of a transistor switch through a zener diode having a predetermined clamping voltage, said one leg developing a test voltage across said zener diode representative of voltage across said protected circuit, said undervoltage coil being connected in series with an emitter and collector of said transistor switch and in series with a field effect transistor, said field effect transistor keeping series current through said undervoltage coil at a constant value, said zener diode becoming non-conductive when said test voltage is less than said predetermined clamping voltage to thereby turn off said transistor switch and de-energize said undervoltage release coil.

2. The circuit breaker with self contained electronic trip actuator of claim 1 further including a capacitor and a diode both connected in parallel with said undervoltage release coil to maintain a constant voltage across said undervoltage release coil.

3. The circuit breaker with self contained electronic trip actuator of claim 1 wherein an anode of said zener diode is connected with said transistor base and wherein a cathode of said zener diode is connected to one side of a first resistor comprising said voltage divider one leg.

4. The circuit breaker with self contained electronic trip actuator of claim 3 including a second resistor connected between said one side of said first resistor and said negative bus to provide a second leg to said voltage divider.

5. The circuit breaker with self contained electronic trip actuator of claim 4 including a third resistor connected between said transistor emitter and said transistor base.

6. The circuit breaker with self contained electronic trip actuator of claim 1 wherein said electronic actuator is enclosed within an actuator case within said circuit breaker case and wherein said circuit breaker cover includes an access door to said actuator case.

7. The circuit breaker with self contained electronic trip actuator of claim 6 wherein said access door comprises a molded plastic rectangular member slidably arranged over an access opening through said circuit breaker cover.

8. A circuit breaker with self contained electronic trip actuator comprising:
a molded plastic circuit breaker cover and a molded plastic circuit breaker case;
a pair of separable contacts within said case electrically connected in series within a protected electric circuit and controlled by an operating mechanism to separate said contacts upon the occurrence of an overcurrent condition through said protected electric circuit;
an electronic actuator within said circuit breaker case and operatively arranged with said operating mechanism for articulating said mechanism to separate said contacts, said electronic actuator including a magnetic latch arranged for holding a mechanical actuator against the bias of a charged spring, said magnetic latch including an undervoltage coil providing magnetic flux to hold said mechanical actuator in a non-actuating position; and
an electronic undervoltage release control circuit within said circuit breaker case connected with said undervoltage release coil and including a rectifier having an output connected across a positive and a negative bus and an input connected with an undervoltage release signal, a zener diode and a current limiting resistor connected with each other and with the cathode of a regulator diode, the anode of said regulator diode being connected with an emitter of a transistor switch through a feedback resistor connected to the reference input of said regulator diode, the base of said transistor switch being connected to a cathode of said regulator diode and the collector of said transistor switch being connected with said undervoltage release coil whereby a test voltage developed across said zener diode renders said zener diode conductive when in excess of a predetermined clamping voltage thereby generating a base current to said transistor switch to energize said undervoltage release coil, said regulator diode maintaining said current through said undervoltage release coil at a constant value.

9. The circuit breaker with self contained electronic trip actuator of claim 8 including a capacitor connected across said regulator diode to maintain a constant voltage across said regulator diode.

10. The circuit breaker with self contained electronic trip actuator of claim 1 or 8 wherein said electronic undervoltage release control circuit is arranged on a printed wire board attached to said undervoltage release coil.

* * * * *